(12) United States Patent
Sagimori

(10) Patent No.: US 11,820,157 B2
(45) Date of Patent: Nov. 21, 2023

(54) IMAGE FORMING APPARATUS, METHOD FOR DERIVING CORRECTION DATA, AND NON-TRANSITORY COMPUTER-READABLE STORAGE MEDIUM

(71) Applicant: Yuuki Sagimori, Kanagawa (JP)

(72) Inventor: Yuuki Sagimori, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 255 days.

(21) Appl. No.: 17/354,950

(22) Filed: Jun. 22, 2021

(65) Prior Publication Data

US 2022/0016902 A1 Jan. 20, 2022

(30) Foreign Application Priority Data

Jul. 15, 2020 (JP) ................. 2020-121390

(51) Int. Cl.
*B41J 29/393* (2006.01)
*B41J 2/36* (2006.01)
*B41J 2/045* (2006.01)

(52) U.S. Cl.
CPC ........... *B41J 2/362* (2013.01); *B41J 2/04508* (2013.01); *B41J 2/04541* (2013.01)

(58) Field of Classification Search
CPC ........ B41J 29/393; B41J 2/362; H04N 1/6055
See application file for complete search history.

(56) References Cited

U.S. PATENT DOCUMENTS

| 5,185,673 A | 2/1993 | Sobol |
| 2003/0053154 A1 | 3/2003 | Kamisuwa |
| 2005/0099446 A1* | 5/2005 | Mizes ................. B41J 29/393 |
| | | 347/19 |
| 2008/0123121 A1 | 5/2008 | Sagimori |
| 2012/0223989 A1 | 9/2012 | Takagi et al. |
| 2012/0257220 A1 | 10/2012 | Sagimori |
| 2014/0226187 A1 | 8/2014 | Sagimori |

(Continued)

FOREIGN PATENT DOCUMENTS

| JP | 2007-196472 | 8/2007 |
| JP | 2018-075819 | 5/2018 |

OTHER PUBLICATIONS

European Search Report; Application EP21180468; dated Nov. 30, 2021.

*Primary Examiner* — Lam S Nguyen
(74) *Attorney, Agent, or Firm* — Duft & Bornsen, PC

(57) ABSTRACT

An image forming apparatus includes an image forming device, a reading device, and circuitry. The image forming device discharges ink droplets through nozzles to form an image on a recording medium conveyed in a first direction. The reading device reads the image formed on the recording medium. The circuitry generates a correction chart that includes patches, located in the first direction and representing different densities from each other, and two marks located at different positions from each other in a second direction perpendicular to the first direction. The circuitry locates opposed end portions of the patches in the second direction outside the two marks in the second direction. The circuitry derives correction data, based on read data of an area of the patches existing inside the two marks in the second direction included in read data provided by the reading device reading the correction chart formed on the recording medium.

6 Claims, 12 Drawing Sheets

(56) References Cited

U.S. PATENT DOCUMENTS

| | | | |
|---|---|---|---|
| 2015/0002907 A1* | 1/2015 | Ukishima | H04N 1/6041 |
| | | | 358/3.24 |
| 2016/0119502 A1 | 4/2016 | Sagimori | |
| 2017/0064142 A1 | 3/2017 | Tsukada | |
| 2017/0272611 A1 | 9/2017 | Sagimori et al. | |
| 2018/0268269 A1 | 9/2018 | Sagimori et al. | |

* cited by examiner

IMAGE FORMING APPARATUS, METHOD FOR DERIVING CORRECTION DATA, AND NON-TRANSITORY COMPUTER-READABLE STORAGE MEDIUM

CROSS-REFERENCE TO RELATED APPLICATION

This patent application is based on and claims priority pursuant to 35 U.S.C. § 119(a) to Japanese Patent Application No. 2020-121390, filed on Jul. 15, 2020, in the Japan Patent Office, the entire disclosure of which is hereby incorporated by reference herein.

BACKGROUND

Technical Field

Embodiments of the present disclosure relate to an image forming apparatus, a method for deriving correction data, and a non-transitory computer-readable storage medium storing computer-readable program code that causes a computer to perform the method for deriving correction data.

Related Art

A typical inkjet image forming apparatus prints a correction chart including a plurality of density patterns on a recording medium and reads the recording medium with a reading device such as a charge-coupled device (CCD), to detect and correct a density unevenness.

SUMMARY

In one embodiment of the present disclosure, a novel image forming apparatus includes an image forming device, a reading device, and circuitry. The image forming device includes a head. The head includes a plurality of nozzles and is configured to discharge ink droplets through the plurality of nozzles to form an image on a recording medium conveyed in a first direction. The reading device is configured to read the image formed on the recording medium. The circuitry is configured to generate a correction chart. The correction chart includes a plurality of patches and two marks. The plurality of patches is located in the first direction and represents different densities from each other. The two marks are located at different positions from each other in a second direction perpendicular to the first direction. The circuitry is configured to locate opposed end portions of the plurality of patches in the second direction outside the two marks in the second direction. The circuitry is configured to derive correction data, based on read data provided by the reading device reading the correction chart formed on the recording medium. The read data includes read data of an area of the plurality of patches existing inside the two marks in the second direction. The circuitry is configured to derive the correction data, based on the read data of the area of the plurality of patches existing inside the two marks in the second direction.

Also described are novel method for deriving correction data and non-transitory computer-readable storage medium storing computer-readable program code that causes a computer to perform the method for deriving correction data.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
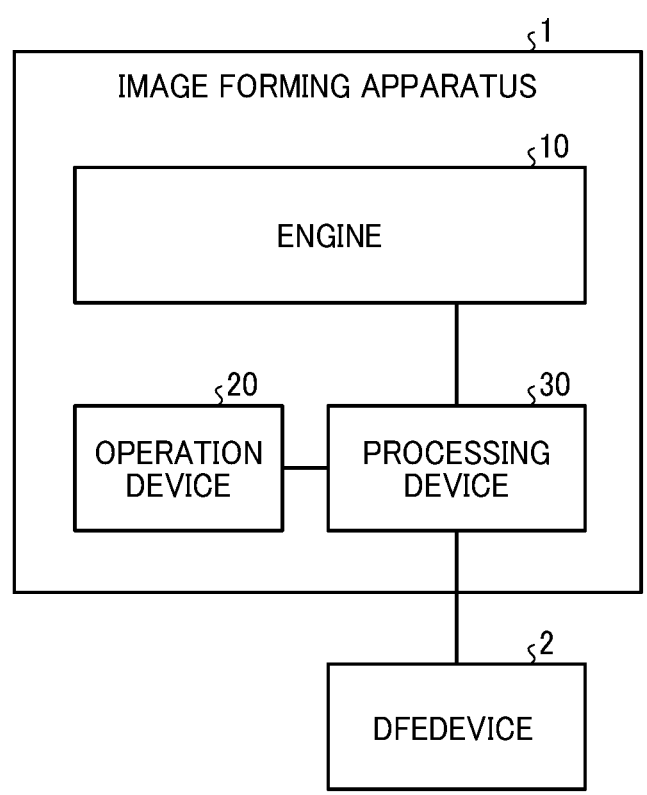
FIG. 1 is a diagram illustrating an image forming system according to an embodiment.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result. As used herein, the singular forms "a," "an," and "the" are intended to include the plural forms as well, unless the context clearly indicates otherwise.

In a later-described comparative example, embodiment, and exemplary variation, for the sake of simplicity, like reference numerals are given to identical or corresponding constituent elements such as parts and materials having the same functions, and redundant descriptions thereof are omitted unless otherwise required.

It is to be noted that, in the following description, suffixes Y, M, C, and K denote colors of yellow, magenta, cyan, and black, respectively. To simplify the description, these suffixes are omitted unless necessary.

Referring to the drawings, wherein like reference numerals designate identical or corresponding parts throughout the several views, embodiments of the present disclosure are described below.

Initially with reference to FIG. 1, a description is given of an image forming system according to an embodiment of the present disclosure.

FIG. 1 is a diagram illustrating an image forming system according to the present embodiment.

As illustrated in FIG. 1, the image forming system includes an image forming apparatus 1 and a digital front end (DFE) device 2.

The image forming apparatus 1 is an inkjet image forming apparatus. The image forming apparatus 1 includes an engine 10, an operation device 20, and a processing device 30.

Figure 2:
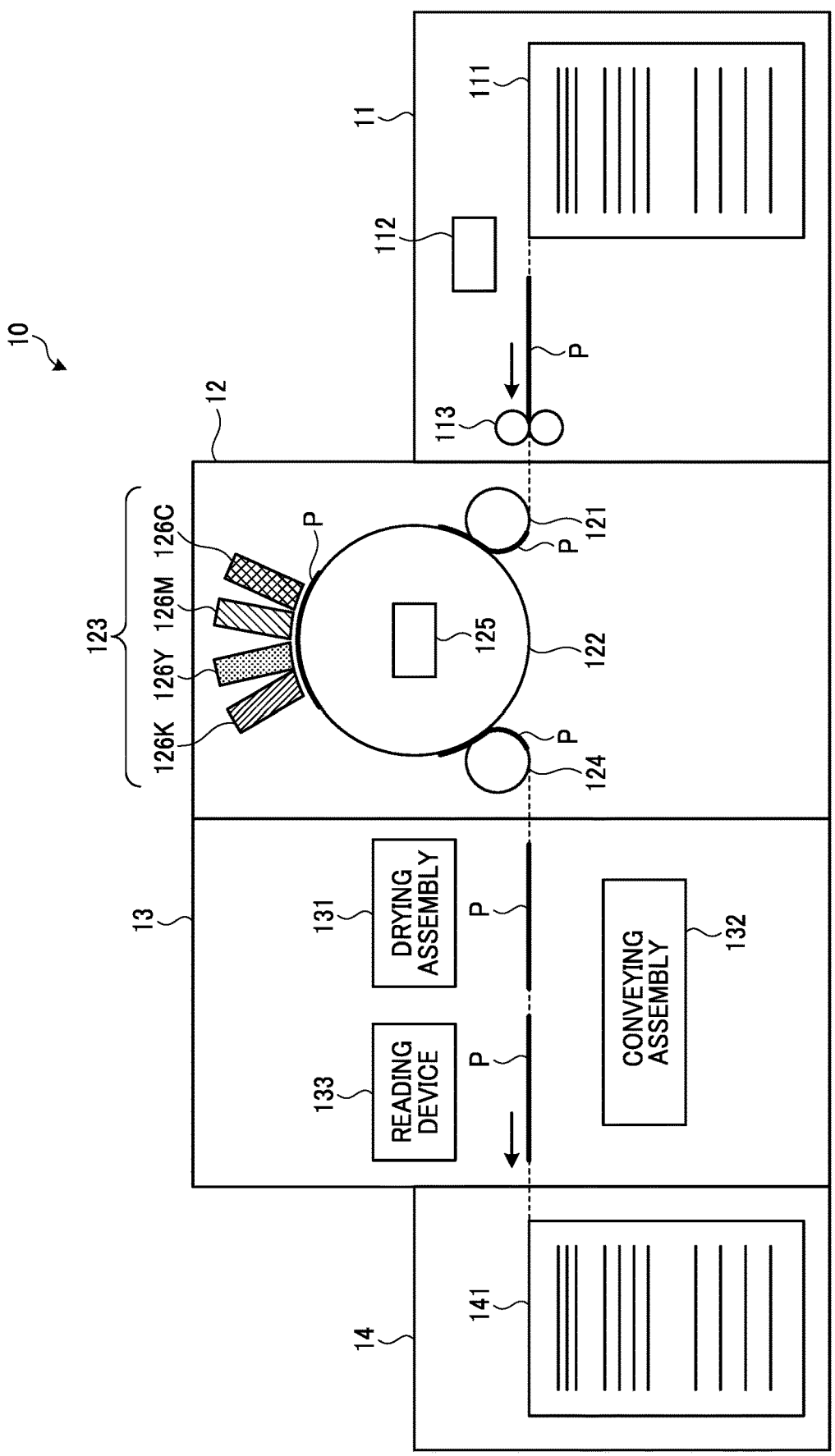
FIG. 2 is a diagram illustrating a configuration of an engine of an image forming apparatus according to an embodiment.

The engine 10 is a mechanical device to from an image. The engine 10 includes, e.g., an image forming device 12 and a reading device 133 (as illustrated in FIG. 2). The operation device 20 is a user interface to receive an operation for the image forming apparatus 1. The operation device 20 includes an input device, such as an operation key or a touch panel, and an output device such as a display device. The display device displays, e.g., an operation state or a screen related to the operation of the image forming apparatus 1.

The processing device 30 is a controller to control the operation of the image forming apparatus 1. The processing device 30 is connected to the engine 10, the operation device 20, and the DFE device 2. The processing device 30 may be a computer device capable of executing applications on various operating systems.

The DFE device 2 is a device that performs data processing for input to the image forming apparatus 1. For example, the DFE device 2 draws and expands print data generated in a format such as a page description language (PDL) to convert the print data into raster data. The DFE device 2 outputs the raster data to the image forming apparatus 1 (specifically, the processing device 30). The processing device 30 causes the engine 10 to execute image formation (i.e., printing) according to the raster data generated by the DFE device 2.

Although FIG. 1 illustrates the processing device 30 as a part of the image forming apparatus 1, the processing device 30 may be separate from the image forming apparatus 1. In this case, the processing device 30 may be implemented by an information processing device such as a personal computer (PC) and connected to the image forming apparatus 1 such that the processing device 30 can communicate with the image forming apparatus 1. Although FIG. 1 illustrates the DFE device 2 that is separate from the image forming apparatus 1, the DFE device 2 may be a part of the image forming apparatus 1 or may be provided together with the processing device 30 in a common apparatus such as an information processing device.

Referring now to FIG. 2, a description is given of a configuration of the engine 10 described above.

FIG. 2 is a diagram illustrating an example of the configuration of the engine 10 of the image forming apparatus 1.

As illustrated in FIG. 2, the engine 10 includes a sheet feeding device 11, the image forming device 12, a drying device 13, and a sheet ejection device 14.

The sheet feeding device 11 includes an input tray 111, a sheet feeder 112, and a registration roller pair 113. A plurality of sheets P serving as recording media is stackable on the input tray 111. The sheet feeder 112 separates and feeds the sheets P one at a time from the input tray 111. The registration roller pair 113 sends the sheet P to the image forming device 12.

Any sheet feeder may be used as the sheet feeder 112, such as a device with a roller or a device with air suction. After the leading end of the sheet P fed from the input tray 111 by the sheet feeder 112 reaches the registration roller pair 113, the registration roller pair 113 is driven at a given time to feed the sheet P to the image forming device 12. Note that the sheet feeding device 11 may have any configuration provided that the sheet feeding device 11 sends the sheet P to the image forming device 12.

The image forming device 12 includes a receiving cylinder 121 and a sheet bearing drum 122. The receiving cylinder 121 conveys the fed sheet P to the sheet bearing drum 122. The sheet bearing drum 122 bears, on an outer circumferential surface of the sheet bearing drum 122, the sheet P conveyed by the receiving cylinder 121, to convey the sheet P to a position opposite an ink discharge device 123. The image forming device 12 further includes the ink discharge device 123 and a transfer cylinder 124. The ink discharge device 123 discharges ink droplets toward the sheet P borne on the sheet bearing drum 122. The transfer cylinder 124 conveys the sheet P bearing discharged ink droplets from the sheet bearing drum 122 to the drying device 13.

As the leading end of the sheet P conveyed from the sheet feeding device 11 to the image forming device 12 is held by a sheet gripper provided on the surface of the receiving cylinder 121, the sheet P is conveyed along with the surface movement of the receiving cylinder 121. The sheet P thus conveyed by the receiving cylinder 121 is delivered to the sheet bearing drum 122 at a position opposite the sheet bearing drum 122.

A sheet gripper is also provided on the surface of the sheet bearing drum 122 to grip the leading end of the sheet P. A plurality of suction holes is dispersedly formed on the surface of the sheet bearing drum 122. A suction device 125 generates a suction air flow toward the inside of the sheet bearing drum 122 for each of the suction holes. The leading end of the sheet P delivered from the receiving cylinder 121 to the sheet bearing drum 122 is held by the sheet gripper, while the sheet P is attracted to the surface of the sheet bearing drum 122 by the suction air flow. In this state, the sheet P is conveyed along with the surface movement of the sheet bearing drum 122.

The ink discharge device 123 discharges ink droplets of four colors, namely, cyan (C), magenta (M), yellow (Y), and black (K), to form an image on the sheet P. The ink discharge device 123 includes heads 126C, 126M, 126Y, and 126K to discharge ink droplets of cyan, magenta, yellow, and black, respectively.

Figure 3:
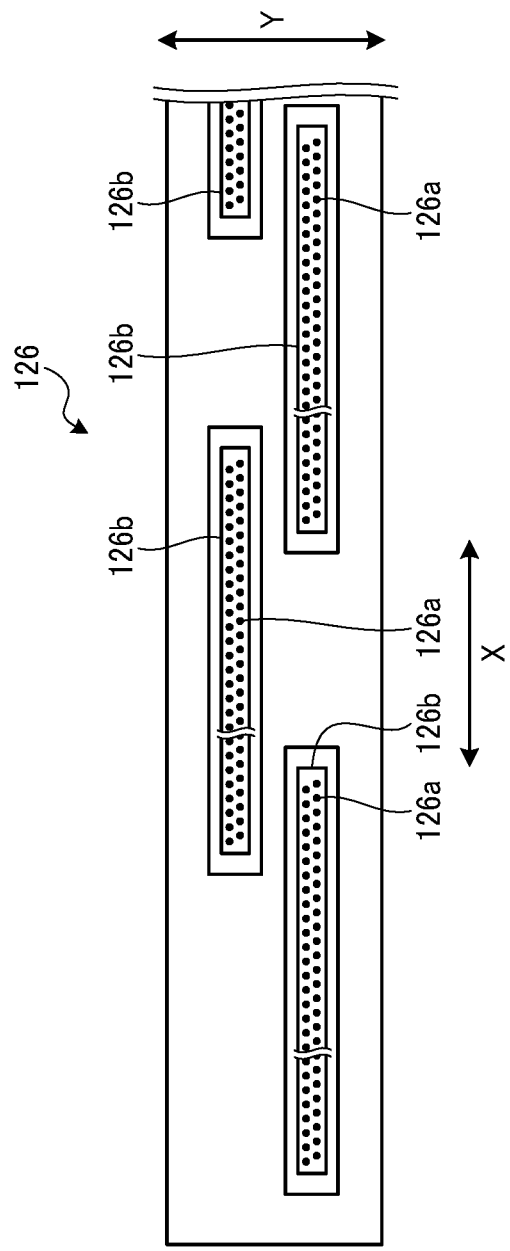
FIG. 3 is a diagram illustrating a configuration of a head according to an embodiment.

The heads 126C, 126M, 126Y, and 126K have substantially the same configurations, differing from each other only in using different colors of recording liquid. Specifically, as illustrated in FIG. 3, each of the heads 126C, 126M, 126Y, and 126K includes a plurality of nozzles 126a and discharges ink droplets through the plurality of nozzles 126a. The heads 126 for each color are arranged side by side in a main scanning direction perpendicular to a sub-scanning direction such that the respective longitudinal ends of adjacent ones of the heads 126 overlap each other in the sub-scanning direction. The heads 126C, 126M, 126Y, and 126K may be simply referred to as the heads 126 when the heads 126C, 126M, 126Y, and 126K are not distinguished from each other. The sub-scanning direction is an example of a first direction. The main scanning direction is an example of a second direction.

Referring now to FIG. 3, a detailed description is given of the heads 126 described above.

FIG. 3 is a diagram illustrating a configuration of one of the heads 126.

As illustrated in FIG. 3, the head 126 includes a nozzle array 126b in which a large number of nozzles 126a are arranged side by side in a line shape to form at least one nozzle array along the main scanning direction (i.e., X direction in FIG. 3).

The head 126 includes the nozzle arrays 126b in a plurality of rows such as two rows along the sub-scanning direction (i.e., Y direction in FIG. 3), which is a direction two-dimensionally perpendicular to the main scanning direction. The nozzle arrays 126b in two rows are arranged side by side such that the nozzle array 126b in the front row (i.e., an upper nozzle array 126b in FIG. 3) and the nozzle array 126b in the rear row (i.e., a lower nozzle array 126b in FIG. 3) are located in a staggered manner. That is, the nozzle arrays 126b are arranged side by side in the main scanning direction such that the respective longitudinal ends of adjacent ones of the nozzle arrays 126b overlap each other in the sub-scanning direction. In other words, the heads 126C, 126M, 126Y, and 126K illustrated in FIG. 1 are full-line inkjet heads.

The individual discharge operations of the heads 126 are controlled by drive signals according to image data. Specifically, each of the nozzles 126a of the head 126 is provided with an actuator to discharge liquid. The drive signal drives the actuator, thus controlling the ink droplet discharge operation.

The processing device 30 performs control to supply the drive signal to the actuator for each of the nozzles 126a of each of the heads 126. Specifically, the processing device 30 drives the actuator for each of the nozzles 126a to discharge ink droplets through the nozzle 126a to form an image on a sheet P. With such a configuration, when the sheet P borne on the sheet bearing drum 122 passes an area opposite the ink discharge device 123, the heads 126C, 126M, 126Y, and 126K discharge ink droplets of cyan, magenta, yellow, and black, respectively, to form an image on the sheet P according to image data to be formed.

Note that the actuator for each of the nozzles 126a of the head 126 may be a shape deformation element actuator such as a piezo actuator, or may be another type of movable actuator. The actuator may be a heating actuator, such as a thermal actuator, which boils recording liquid with a heater and discharges the recording liquid from the nozzle 126a. Alternatively, the actuator may apply a voltage and discharges recording liquid by electrostatic attraction.

Referring back to FIG. 2, the drying device 13 includes a drying assembly 131 and a conveying assembly 132. The drying assembly 131 dries ink droplets that has adhered to the sheet P in the image forming device 12. The conveying assembly 132 conveys the sheet P output from the image forming device 12 to the sheet ejection device 14.

The conveying assembly 132 conveys the sheet P bearing the image formed by the image forming device 12 such that the sheet P passes through the drying assembly 131 to the sheet ejection device 14. The drying assembly 131 performs a drying process on the sheet P passing through the drying assembly 131. In the drying process, liquid components such as moisture in the ink droplets on the sheet P are evaporated and therefore the ink droplets adhere to the sheet P, while curling of the sheet P is prevented.

The drying device 13 further includes the reading device 133. The reading device 133 includes an image sensor such as a charge-coupled device (CCD). The reading device 133 is disposed along a conveyance passage in the conveying assembly 132. The reading device 133 captures the sheet P conveyed along the conveyance passage, thus reading the image formed on the sheet P.

The sheet ejection device 14 includes an output tray 141 on which a plurality of sheets P is stackable. The sheets P conveyed from the drying device 13 are sequentially stacked and held on the output tray 141. Note that the sheet ejection device 14 may have any configuration provided that the sheet ejection device 14 ejects the sheets P.

FIG. 2 illustrates the engine 10 that includes the sheet feeding device 11, the image forming device 12, the drying device 13, and the sheet ejection device 14. The engine 10 may include another functional device as appropriate. For example, the engine 10 may include a pre-processing device disposed between the sheet feeding device 11 and the image forming device 12 to perform pre-processing of image formation. The engine 10 may include a post-processing device disposed between the drying device 13 and the sheet ejection device 14 to perform post-processing of image formation.

As an example of the pre-processing device, a device that performs a treatment liquid applying process of applying, to a sheet P, a treatment liquid that reacts with ink to prevent the ink from bleeding. As an example of the post-processing device, a sheet reverse conveying device may be disposed to reverse a sheet P bearing an image formed by the image forming device 12 on one side of the sheet P and send the sheet P to the image forming device 12 again to form another image on another side of the sheet P. Other examples of the post-processing device include, but are not limited to, a device that performs a process of binding a plurality of sheets P bearing images, a correction assembly that corrects deformation of sheets P, and a cooling assembly that cools down sheets P.

FIG. 2 illustrates the reading device 133 disposed at a later stage of or downstream from the drying assembly 131 in a sheet conveying direction in which the sheet P is conveyed. However, the position at which the reading device 133 is disposed is not limited to the position illustrated in FIG. 2. For example, the reading device 133 may be disposed between the image forming device 12 and the drying device 13, or between the drying device 13 and the sheet ejection device 14. Alternatively, the reading device 133 may be disposed inside the image forming device 12 as illustrated in FIG. 4.

Figure 4:
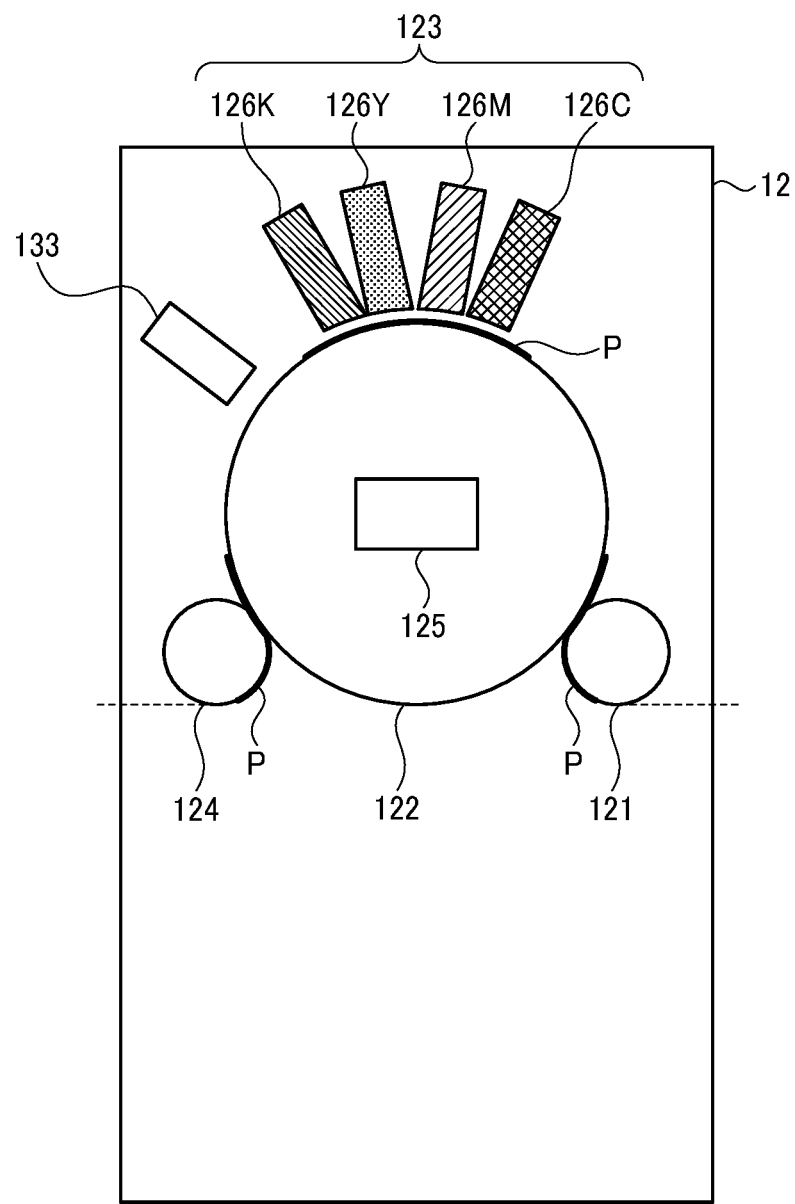
FIG. 4 is a diagram illustrating a configuration of an image forming device according to an embodiment.

FIG. 4 is a diagram illustrating another example of the configuration of the image forming device 12 described above.

In the present example, the reading device 133 is disposed at a later stage of or downstream from the ink discharge device 123 in the sheet conveying direction in which the sheet P is conveyed. Specifically, the reading device 133 is disposed near the sheet bearing drum 122 and at a later stage of or downstream from the ink discharge device 123 in the sheet conveying direction. In this case, the reading device 133 captures the sheet P bearing an image formed by the ink discharge device 123 while the sheet P is conveyed on the sheet bearing drum 122, thus reading the image formed on the sheet P.

Figure 5:
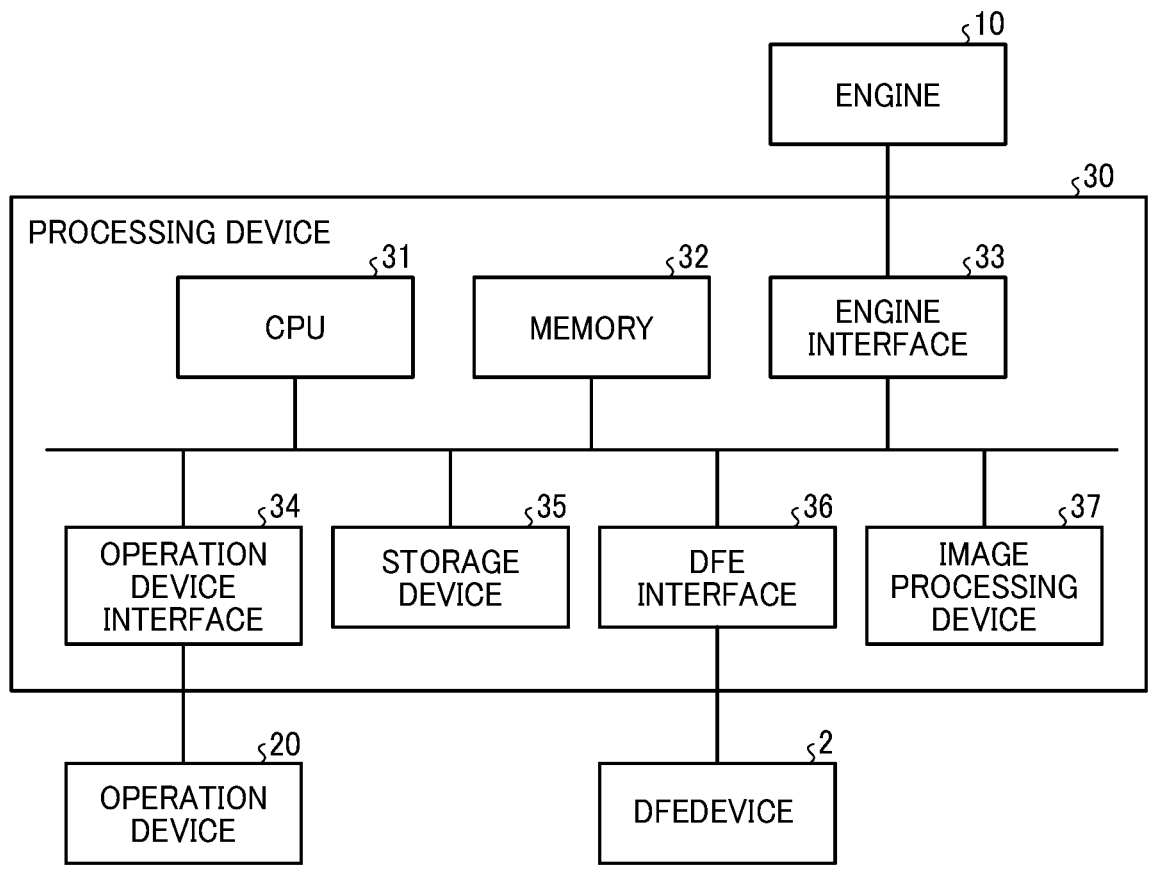
FIG. 5 is a diagram illustrating a hardware configuration of a processing device according to an embodiment.

Referring now to FIG. 5, a description is given of a configuration of the processing device 30 described above.

FIG. 5 is a diagram illustrating a hardware configuration of the processing device 30.

As illustrated in FIG. 5, the processing device 30 includes a central processing unit (CPU) 31, a memory 32, an engine interface 33, an operation device interface 34, a storage device 35, a DFE interface 36, and an image processing device 37.

The CPU 31 is an example of a processor. The CPU 31 controls the operations of the processing device 30 and the image forming apparatus 1 as a whole. The memory 32 includes, e.g., a read only memory (ROM) and a random access memory (RAM). The memory 32 stores, e.g., setting information and various programs related to the operation of the processing device 30.

The engine interface 33 is an interface to connect the engine 10 to the processing device 30. Under the control of the CPU 31, the engine interface 33 exchanges various kinds of data with the engine 10. For example, the engine interface 33 transmits, to the engine 10, a drive signal to control the operation of the image forming device 12. On the other hand, the engine interface 33 receives read data provided by the reading device 133 from the engine 10.

The operation device interface 34 is an interface to connect the operation device 20 to the processing device 30. Under the control of the CPU 31, the operation device interface 34 exchanges various kinds of data with the operation device 20. For example, the operation device interface 34 receives an operation signal input via the operation device 20. On the other hand, the operation device interface 34 outputs and displays, on the operation device 20, a processing status.

The storage device 35 is, e.g., a hard disk drive (HDD) or a solid state drive (SSD). The storage device 35 stores, e.g., setting information and various programs related to the operation of the processing device 30 (or the image forming apparatus 1). The storage device 35 also stores dither patterns described later.

Figure 6:
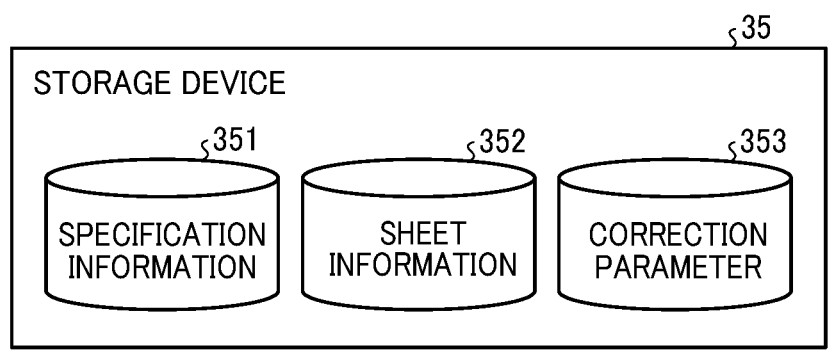
FIG. 6 is a diagram illustrating an example of information stored in a storage device according to an embodiment.

In addition, as illustrated in FIG. 6, the storage device 35 stores, e.g., specification information 351, sheet information 352, and a correction parameter 353.

FIG. 6 is a diagram illustrating an example of information stored in the storage device 35.

The specification information 351 retains information indicating, e.g., specifications of the engine 10. For example, the specification information 351 retains the printing speed and conveyance speed of the sheet P, the printing range in the main scanning direction, the printing resolutions in the main scanning direction and the sub-scanning direction, and the reading resolutions in the main scanning direction and the sub-scanning direction of the reading device 133.

The specification information 351 retains flare characteristics indicating characteristics of a flare that occurs when the reading device 133 reads an image (e.g., a correction chart) printed on the sheet P. Here, the flare indicates a phenomenon that occurs at a density boundary between different densities when the reading device 133 reads the sheet P. When the flare occurs, the reading device 133 reads a density value different from an actual density value, due to the influence of scattering or reflection of incident light. More specifically, the flare appears significantly at a boundary between a blank portion of the sheet P and a density patch described later or at a boundary between adjacent density patches. Hereinafter, a density boundary of a density patch, or a density boundary between density patches, may be referred to as an edge portion.

Referring now to FIGS. 7A to 8B, a description is given of the flare characteristics of the image forming apparatus 1 (specifically, the engine 10).

Figure 7A:
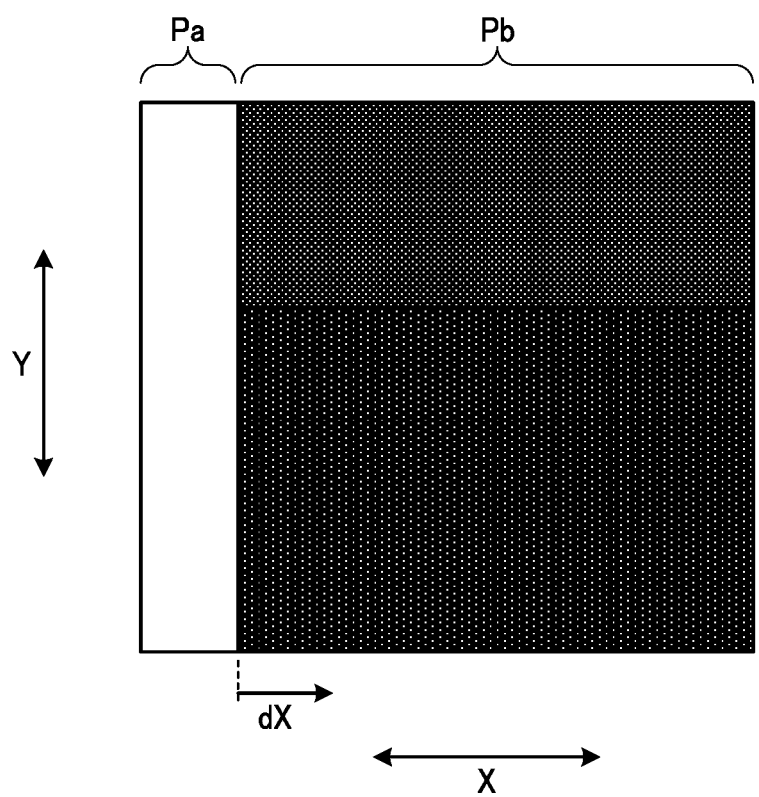
FIG. 7A is a schematic diagram illustrating an edge portion in a main scanning direction on a sheet.
Figure 7B:
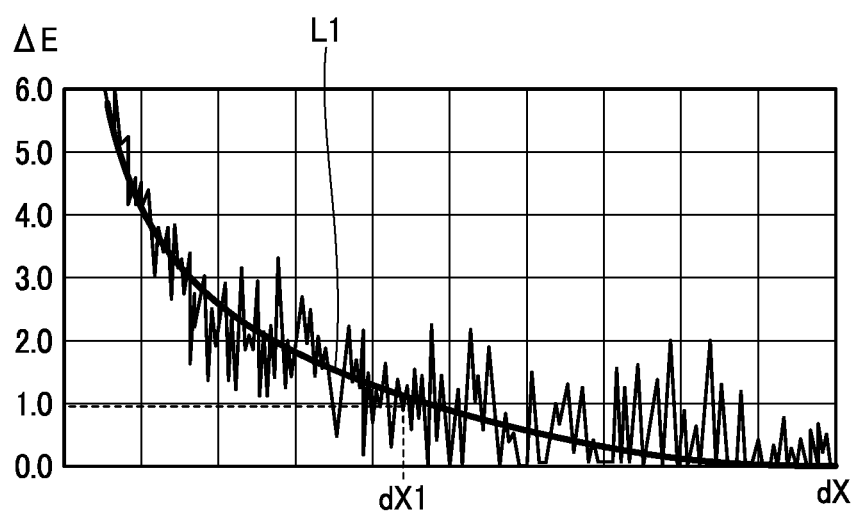
FIG. 7B is a graph illustrating a relationship between the distance from the edge portion illustrated in FIG. 7A and the density difference between the density detected from an area and a reference density value.

FIGS. 7A and 7B illustrate the flare characteristics in the main scanning direction.

Specifically, FIG. 7A is a schematic diagram illustrating an edge portion in the main scanning direction (i.e., the X direction) on a sheet P. In FIG. 7A, an area Pa indicates a blank portion of the sheet P; whereas an area Pb indicates an area in which a density pattern (corresponding to patches described later) is printed. Here, the starting position of an arrow dX indicated by the broken line corresponds to the edge portion in the main scanning direction.

FIG. 7B is a graph illustrating a relationship between the distance from the edge portion illustrated in FIG. 7A and the density difference (i.e., color difference) between the density detected from the area Pb and a reference density value. Here, the horizontal axis represents a distance dX from the edge portion in the main scanning direction. The vertical axis represents a density difference ΔE (i.e., color difference) between the reference density value (i.e., reference color density) and the density value of the area Pb read by the reading device 133. Note that the horizontal axis indicates that the distance from the edge portion increases toward the right in FIG. 7B.

Figure 8A:
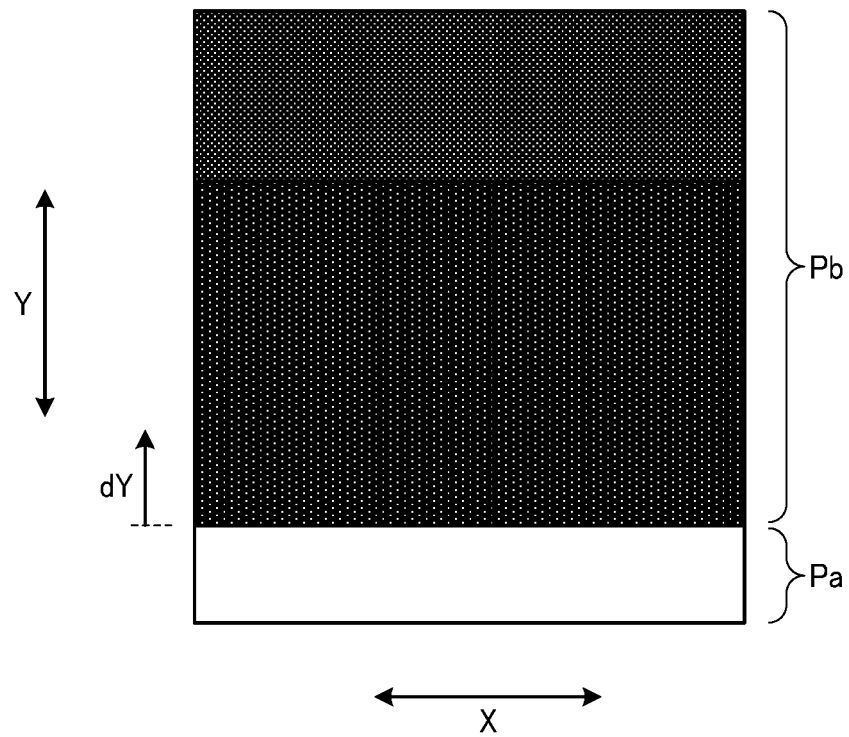
FIG. 8A is a schematic diagram illustrating an edge portion in a sub-scanning direction on a sheet.
Figure 8B:
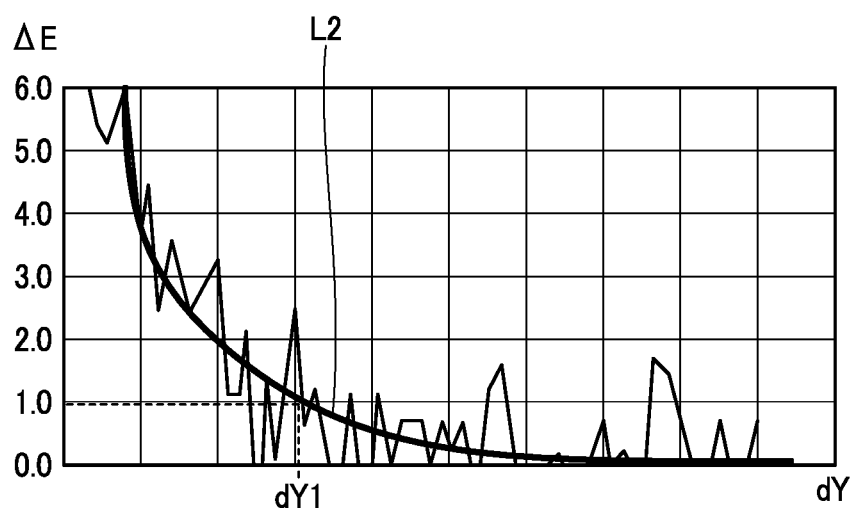
FIG. 8B is a graph illustrating a relationship between the distance from the edge portion illustrated in FIG. 8A and the density difference between the density detected from an area and a reference density value.

FIGS. 8A and 8B illustrate the flare characteristics in the sub-scanning direction.

Specifically, FIG. 8A is a schematic diagram illustrating an edge portion in the sub-scanning direction (i.e., the Y direction) on a sheet P. In FIG. 8A, an area Pa indicates a blank portion of the sheet P (or a density pattern adjacent to an area Pb); whereas the area Pb indicates an area in which a density pattern is printed. Here, the starting position of an arrow dY indicated by the broken line corresponds to the edge portion in the sub-scanning direction.

FIG. 8B is a graph illustrating a relationship between the distance from the edge portion illustrated in FIG. 8A and the density difference (i.e., color difference) between the density detected from the area Pb and a reference density value. Here, the horizontal axis represents a distance dY from the edge portion in the sub-scanning direction. The vertical axis represents a density difference ΔE (i.e., color difference) between the reference density value (i.e., reference color density) and the density value of the area Pb read by the reading device 133. Note that the horizontal axis indicates that the distance from the edge portion increases toward the right in FIG. 8B.

As illustrated in FIGS. 7B to 8B, the density difference ΔE is relatively large near the edge portion and decreases as the distance from the edge portion increases. In other words, in each of the main scanning direction and the sub-scanning direction, the influence of the flare appears significantly near the edge portion while the influence of the flare decreases as the distance from the edge portion increases.

The specification information 351 stores, as flare characteristics, the tendencies of the flare in the main scanning direction and the sub-scanning direction when the reading device 133 reads the density image, that is, the influence of the flare relative to the distance from the edge portion. For example, the specification information 351 retains, as flare characteristics, the graphs illustrated in FIGS. 7B and 8B and relational expressions from which approximate curves L1 and L2 representing the relationship between the distance from the edge portion and the density difference are derivable.

Referring back to FIG. 6, the sheet information 352 retains information on the sheets P usable in the image forming apparatus 1. For example, the sheet information 352 retains, for each type of the sheets P, characteristics such as the size (e.g., lengths in the main scanning direction and the sub-scanning direction) of the sheet P. In a case in which the flare characteristics change depending on the qualities of the sheets P (e.g., plain paper or glossy paper), the sheet information 352 may retain, for each type of the sheets P, the flare characteristics for the quality of the sheet P.

The correction parameter 353 is an example of correction data. The correction parameter 353 retains a correction parameter related to correction of a density unevenness of an image formed by the image forming device 12. Specifically, the correction parameter 353 retains a correction parameter for collecting a density unevenness of an image formed by the heads 126C, 126M, 126Y, and 126K (specifically, the nozzles 126a). For example, the correction parameter may be a parameter for correcting a dither pattern or a parameter for controlling the discharge of ink droplets. Note that the processing device 30 drives the heads 126C, 126M, 126Y, and 126 according to the correction parameter 353, thus causing the image forming device 12 to form an image at an appropriate density.

Referring back to FIG. 5, the DFE interface 36 is an interface to connect the DFE device 2 to the processing device 30. Under the control of the CPU 31, the DFE interface 36 exchanges various kinds of data with the DFE device 2. For example, the DFE interface 36 transmits print data to be printed to the DFE device 2. The DFE interface 36 receives raster data generated by the DFE device 2 from the DFE device 2.

The image processing device 37 executes various kinds of image processing. For example, under the control of the CPU 31, the image processing device 37 generates a correction chart representing a plurality of densities. A detailed description of the correction chart is deferred. In addition, under the control of the CPU 31, the image processing device 37 derives, from read data of the correction chart provided by the reading device 133, a correction parameter for correcting a density unevenness of an image formed by the image forming device 12.

The image processing device 37 may be implemented by the CPU 31 executing a program. Alternatively, the image processing device 37 may be implemented by a processing circuit such as a graphics processing unit (GPU) independent of the CPU 31.

Figure 9:
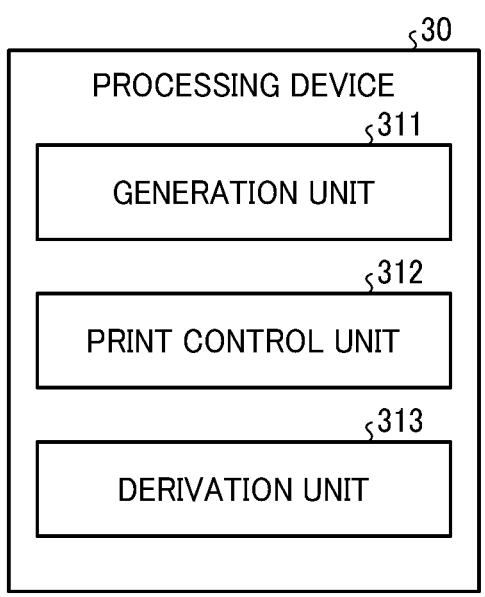
FIG. 9 is a diagram illustrating a functional configuration of a processing device according to an embodiment.

Referring now to FIG. 9, a description is given of a functional configuration of the processing device 30.

FIG. 9 is a diagram illustrating an example of the functional configuration of the processing device 30.

As illustrated in FIG. 9, the processing device 30 includes a generation unit 311, a print control unit 312, and a derivation unit 313.

Part or all of the generation unit 311, the print control unit 312, and the derivation unit 313 may be configured as software implemented by cooperation between the CPU 31 of the processing device 30 and various programs stored in the memory 32. Alternatively, part or all of the generation unit 311, the print control unit 312, and the derivation unit 313 may be configured as hardware implemented by, e.g., a dedicated circuit or dedicated circuits. For example, the generation unit 311 and the derivation unit 313 may be implemented by programs executed by the CPU 31 and the image processing device 37.

The generation unit 311 generates a correction chart for correcting an operation related to image formation, based on the specification information 351 and the sheet information 352. Specifically, the generation unit 311 generates a correction chart including a plurality of patches representing different densities from each other and located (or arrayed) in the sub-scanning direction.

Figure 10:
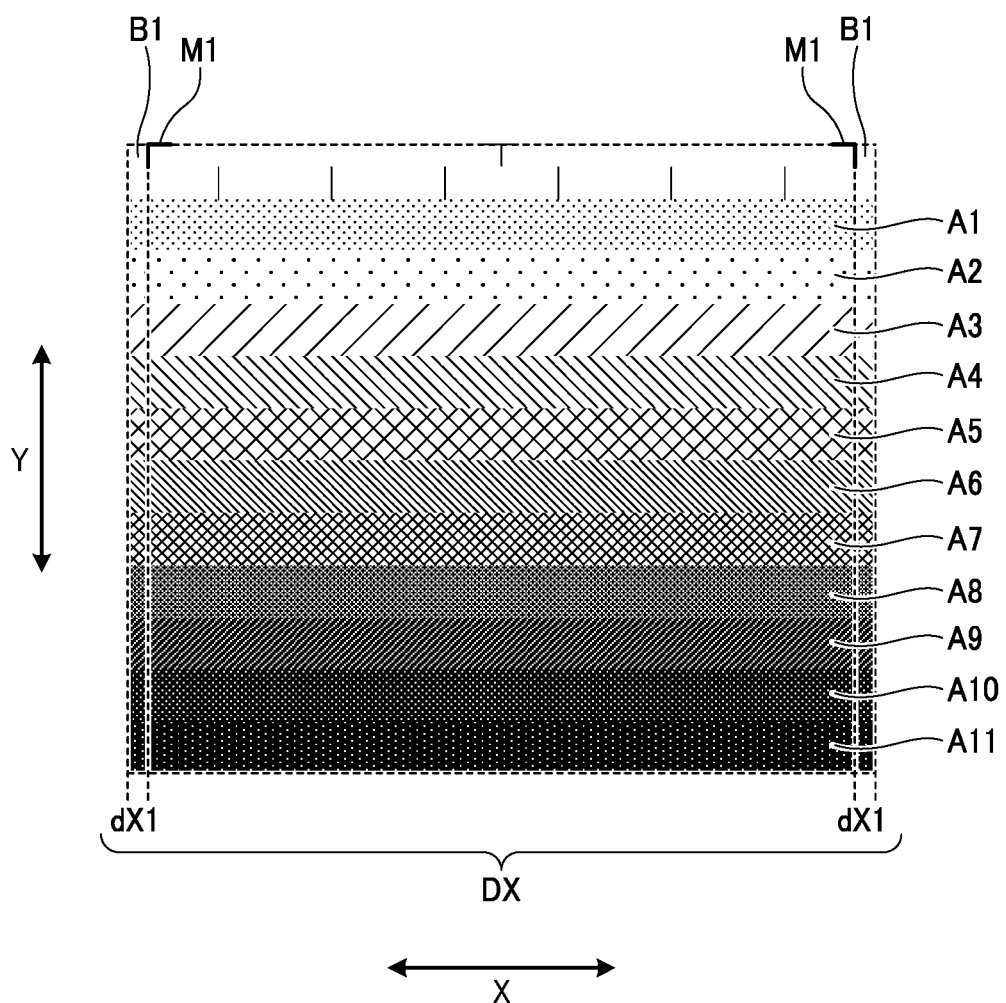
FIG. 10 is a diagram illustrating a correction chart generated by a generation unit according to an embodiment.

Referring now to FIG. 10, a description is given of the correction chart generated by the generation unit 311.

FIG. 10 is a diagram illustrating an example of the correction chart generated by the generation unit 311.

As illustrated in FIG. 10, the correction chart includes a plurality of patches A1 to A11 located in the sub-scanning direction (i.e., the Y direction in FIG. 10) and two marks M1 located at different positions from each other in the main scanning direction (i.e., the X direction in FIG. 10).

The patches A1 to A11 are rectangular areas representing different densities from each other. The densities represented by the patches A1 to A11 are generated based on, e.g., a dither pattern. Dithering is a technique for artificially expressing, with fine dots, shades and colors that are physically unreproducible, as in the case of expressing more tones with a limited number of colors. The dither pattern is data as a basis for dot formation for such an artificial or pseudo expression. Hereinafter, the patches A1 to A11 may be simply referred to as patches A when the patches A1 to A11 are not distinguished from each other.

FIG. 10 illustrates a pattern in which the density is increased from the first patch A1 from which the printing starts to the last patch A11 at which the printing ends. That is, the patch A11 represents a highest density. Although FIG. 10 illustrates the correction chart including 11 densities (or tones), the number of tones and the density pattern are not limited to the number of tones and the density pattern illustrated in FIG. 10.

Here, the length of the correction chart (i.e., the patches A) in the main scanning direction is determined according to the size of the sheet P to be used. Specifically, the generation unit 311 reads, from the sheet information 352, the length in the main scanning direction for the type of the sheet P used for printing. Based on the length thus read, the generation unit 311 determines a length DX of the correction chart in the main scanning direction. The type of the sheet P used for printing may be set in advance or may be designated via the operation device 20.

The length DX of the correction chart in the main scanning direction is not particularly limited provided that the length DX of the correction chart in the main scanning direction is equal to or less than the length of the sheet P in the main scanning direction. The length DX of the correction chart in the main scanning direction may be determined according to the unit of the heads 126 of the image forming device 12. For example, the correction chart is printed without a so-called border so that the length DX of the correction chart in the main scanning direction is equal to the length of the sheet P in the main scanning direction. By contrast, a blank space or margin of the sheet P is provided outside the correction chart (i.e., the patches A) in the main scanning direction so that the length DX of the correction chart in the main scanning direction is less than the length of the sheet P in the main scanning direction. In this case, the flare occurs at a boundary between the blank space (or margin) of the sheet P and the patches A in the main scanning direction.

Therefore, the generation unit 311 sets an invalid area, which is not used for density detection, in an edge portion of the patches A in the main scanning direction, based on the flare characteristics in the main scanning direction stored in the specification information 351. Specifically, the generation unit 311 specifies a distance dX1, at which the density difference ΔE is equal to or less than a threshold, from the edge portion, based on the flare characteristics in the main scanning direction. For example, the generation unit 311 specifies the distance dX1 at which the density difference ΔE is equal to or less than 1, based on the flare characteristics in the main scanning direction illustrated in FIGS. 7A and 7B.

Next, the generation unit 311 sets, as an invalid area B1 that is not used for density detection, an area from the edge portion of the patches A in the main scanning direction to a position separated from the edge portion by the distance dX1 inside the patches A. FIG. 10 illustrates an example in which the invalid area B1 is set at each end portion of the patches A in the main scanning direction. Then, the generation unit 311 locates marks M1 on the correction chart, based on the positions of the invalid areas B1 thus set.

Here, each of the marks M1 is located at a position to specify the invalid areas B1 or an area excluding the invalid areas B1 from the correction chart (such an area may be hereinafter referred to as a detection target area). In other words, each of the two marks M1 is located at a position, in a respective one of the opposed end portions of the plurality of patches A in the main scanning direction, according to a range of the flare that affects reading, by the reading device 133, of the plurality of patches A in the main scanning direction. Thus, the generation unit 311 locates the opposed end portions of the plurality of patches A in the main scanning direction outside the two marks M1 in the main scanning direction. Each of the marks M1 serves as an index for cutting out the correction chart from read data provided by the reading device 133 in a process described later.

Although FIG. 10 illustrates an example in which the marks M1 are located outside the patches A (specifically, the patch A1) in the sub-scanning direction so as not to interfere with density detection, the positions at which the marks M1 are located are not limited to the positions illustrated in FIG. 10. Although FIG. 10 illustrates each of the marks M1 as a trim mark indicating a clipping position in the main scanning direction and the sub-scanning direction, that is, a corner of the detection target area, the shape of the marks M1 is not limited to the shape illustrated in FIG. 10. For example, each of the marks M1 may indicate a clipping position in the main scanning direction. Optionally, other marks may be located together with the marks M1. For example, a mark may be located at a center position in the main scanning direction as illustrated in FIG. 10.

The generation unit 311 also sets the length of the patches A in the sub-scanning direction (i.e., the Y direction) to a length including a range of the flare that affects reading, by the reading device 133, of the patches A in the sub-scanning direction.

Figure 11:
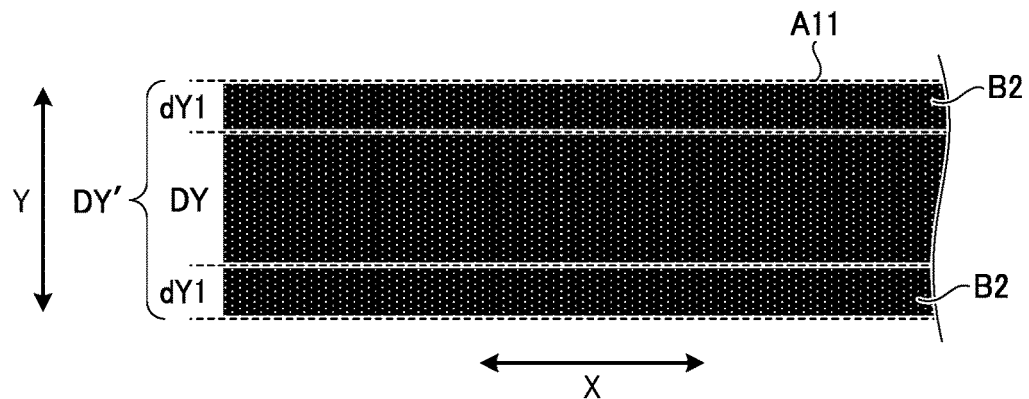
FIG. 11 is an enlarged view of a part of patches illustrated in FIG. 10.

Referring now to FIG. 11, a description is given of a process for setting the length of the patches A in the sub-scanning direction.

FIG. 11 is an enlarged view of the patch A11 as a part of the patches A illustrated in FIG. 10.

First, based on the flare characteristics in the sub-scanning direction stored in the specification information 351, the generation unit 311 specifies a length dY1 of an invalid area B2 in the sub-scanning direction. The invalid area B2 is set for the individual patches A. Specifically, the generation unit 311 specifies a distance dY1, at which the density difference ΔE is equal to or less than a threshold, from an edge portion, based on the flare characteristics in the sub-scanning direction. For example, the generation unit 311 specifies the distance dY1 at which the density difference ΔE is equal to or less than 1, based on the flare characteristics in the sub-scanning direction illustrated in FIGS. 8A and 8B.

Next, the generation unit 311 determines, for each of the patches A, the length in the sub-scanning direction as DY', for example. The DY' is obtained by adding twice the distance dY1 to a given length DY in the sub-scanning direction. In short, DY'=DY+(dY1×2). Then, as illustrated in FIG. 11, the generation unit 311 sets, as the invalid area B2 that is not used for density detection, an area from the edge portion of each of the patches A in the sub-scanning direction to a position separated from the edge portion by the distance dY1 inside the corresponding patch A. Note that the length DY in the sub-scanning direction is a fixed value defining a length sufficient to detect the density. However, the length DY in the sub-scanning direction may be varied according to, e.g., resolution as described later.

Here, the invalid areas B1 and B2 described above correspond to portions of the patches A significantly affected by the flare. Therefore, the detection accuracy is enhanced by detecting the density from a rest of the plurality of patches A excluding the invalid areas B1 and B2, that is, by detecting the density from the target area for density detection.

Note that the invalid area B2 in the sub-scanning direction may be set for each of the patches A, or may be set for some of the patches A. For example, since the influence of the flare increases as the density difference at the edge portions increases, the invalid area B2 may be set only for the patch A11 adjacent to the blank space or margin of the sheet P.

Referring back to FIG. 9, the print control unit 312 causes the correction chart generated by the generation unit 311 to be printed on a sheet P. Specifically, the print control unit 312 causes the image forming device 12 to form the image of the correction chart generated by the generation unit 311 on the sheet P.

Figure 12:
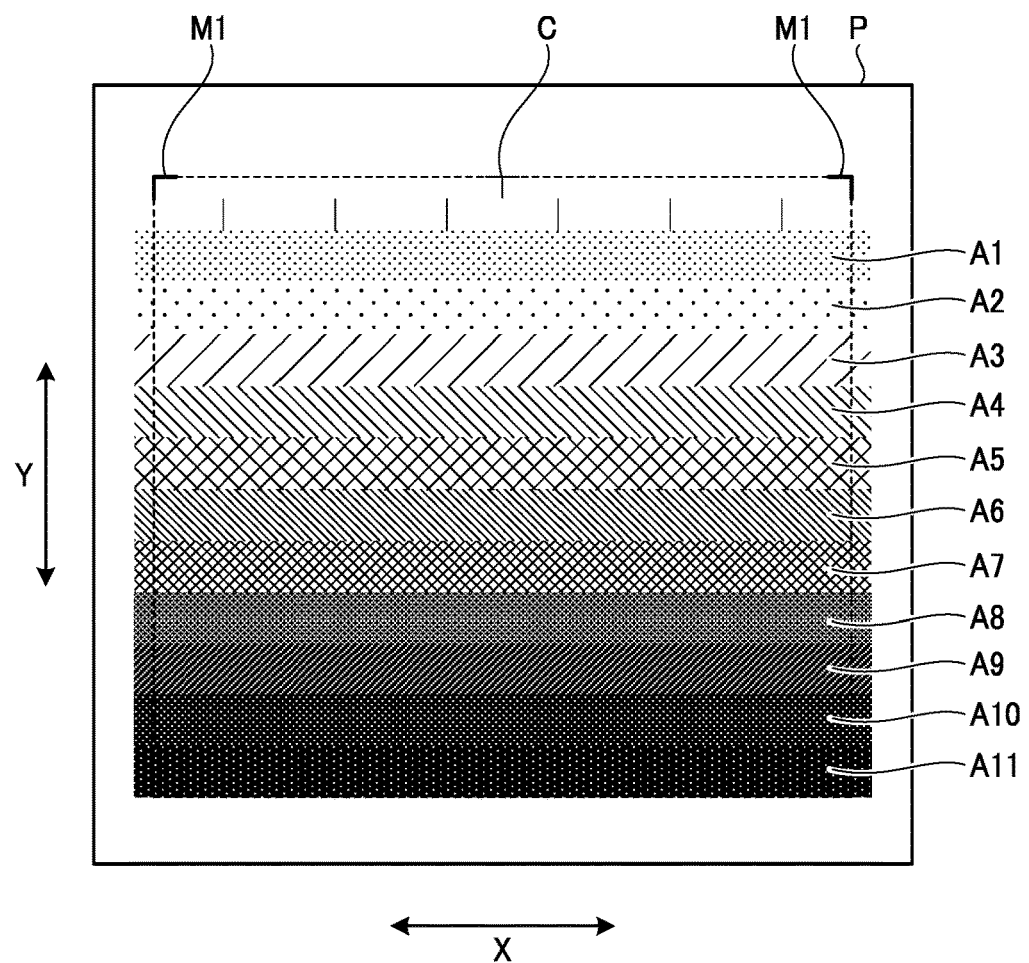
FIG. 12 is a diagram illustrating a correction chart printed on a recording medium.

FIG. 12 is a diagram illustrating an example of the correction chart printed on the sheet P.

As illustrated in FIG. 12, the correction chart printed on the sheet P includes the marks M1 described above. The reading device 133 reads the sheet P bearing the correction chart conveyed from the image forming device 12.

Note that the print control unit 312 may cause the image forming device 12 to directly print the correction chart generated by the generation unit 311. Alternatively, the print control unit 312 may cause the image forming device 12 to print the correction chart generated by the generation unit 311 and processed by, e.g., the DFE device 2.

The derivation unit 313 derives a correction parameter related to the correction of the print density, based on read data provided by the reading device 133 reading the correction chart printed (or formed) on the sheet P. Specifically, the derivation unit 313 acquires the read data provided by the reading device 133 reading the correction chart printed under the control of the print control unit 312. The derivation unit 313 cuts out an area of the patches A existing inside the two marks M1 in the main scanning direction from the read data provided by the reading device 133. For example, when the sheet P in the state illustrated in FIG. 12 is read by the reading device 133, the derivation unit 313 cuts out, as a correction chart, the patches A (i.e., the patches A1 to A11) existing in a rectangular area C defined by the corners of the marks M1.

Next, from each of the patches A constructing the extracted correction chart, the derivation unit 313 detects the density represented by the corresponding patch A. Note that, in a case in which the invalid area B2 is set for the patch A in the sub-scanning direction, the derivation unit 313 detects the density of an area excluding the invalid area B2 from the patch A.

For example, in a case in which the length of the patch A in the sub-scanning direction is DY' (=DY+(dY1×2)) as illustrated in FIG. 11, the derivation unit 313 detects density from the read data of a rest of the patch A excluding the invalid area B2 of the length dY1 from each of the upper and lower ends of the patch A in the sub-scanning direction. The derivation unit 313 derives a correction parameter for correcting a density unevenness, based on the densities detected from the individual patches A. Then, the derivation unit 313 stores the correction parameter in the storage device 35.

Note that the way of deriving the correction parameter is not particularly limited. For example, the derivation unit 313 compares a density value of each of the patches A in a correction chart as a reference prepared in advance (such a correction chart may be hereinafter referred to as a reference chart) with a detected density value or an average of detected density values, to detect the density unevenness by the unit of the heads 126 or the nozzles 126a and derives a correction parameter for correcting the density unevenness.

Here, in the main scanning direction of the patches A printed on the sheet P, the derivation unit 313 cuts out the area defined by the marks M1, thus removing the invalid areas B1 that are significantly affected by the flare. Based on the value of the length dY1 defining the invalid area B2 specified by the generation unit 311, the derivation unit 313 sets, as a target for density detection, the remaining area excluding the invalid areas B2 from the edge portions of the patch A in the sub-scanning direction.

Thus, the derivation unit 313 detects the density from each of the patches A in a state in which the influence of the flare is reduced. The derivation unit 313 accurately detects the densities represented by the patches A, thus enhancing the accuracy of the correction parameter.

Although the length DY of the patch A in the sub-scanning direction is fixed in the present embodiment, the length may be adjusted according to various conditions.

For example, the generation unit 311 adjusts the length DY of the correction chart in the sub-scanning direction, based on the ratio between a resolution as a reference in the sub-scanning direction (such a resolution may be hereinafter referred to as a reference resolution) and a reading resolution of the reading device 133 in the sub-scanning direction. Here, the reference resolution is not particularly limited, and various conditions can be set. For example, the reference resolution may be a resolution in the sub-scanning direction when the reference chart is read by an offline reading device different from the reading device 133.

As an example, the reference resolution in the sub-scanning direction is 600 dots per inch (dpi); whereas a reading resolution of the reading device 133 in the sub-scanning direction stored in the specification information 351 is 300 dpi. In this case, the generation unit 311 adjusts the length DY of a given patch A in the sub-scanning direction to twice, based on the ratio between the reference resolution of 600 dpi and the reading resolution of 300 dpi of the reading device 133. Accordingly, the comparison with the reference chart is facilitated as the read data, in the sub-scanning direction, provided by the reading device 133 is handled in the same manner as the reference resolution.

Similarly, in this case, the generation unit 311 adjusts the length dY1 of the invalid area B2 in the sub-scanning direction by the same magnification as the magnification by which the length DY is adjusted. That is, the generation unit 311 adjusts the length DY' of the patch A including the invalid areas B2 in the sub-scanning direction, based on the reference resolution in the sub-scanning direction and the reading resolution of the reading device 133 in the sub-scanning direction.

Note that, adding the invalid areas B2 to one or more patches A or adjusting the length DY (or DY') in the sub-scanning direction may hamper one sheet P in accommodating all the patches A as a correction chart. In such a case, the generation unit 311 divides the plurality of patches A at a boundary in the sub-scanning direction into a size according to the sheet P to generate a plurality of correction charts. The derivation unit 313 derives a correction parameter, based on read data provided by the reading device (133) reading the plurality of correction charts.

Figure 13A:
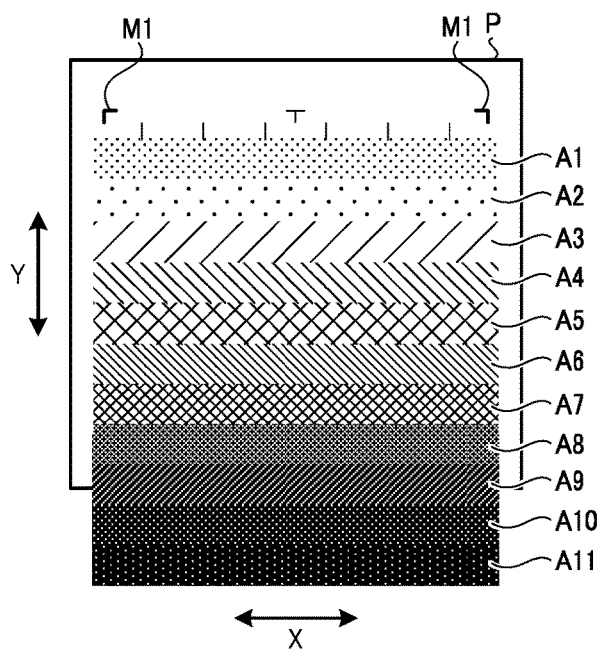
FIG. 13A is a diagram illustrating a correction chart.
Figure 13B:
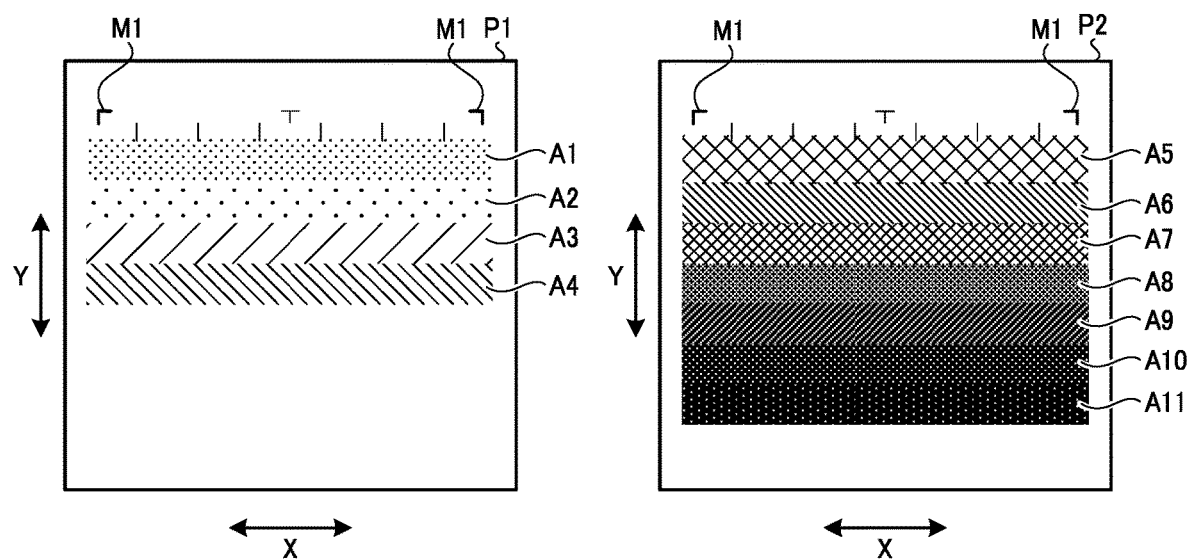
FIG. 13B is a diagram illustrating an example of division of the correction chart illustrated in FIG. 13A.

FIGS. 13A and 13B illustrate an example of division of the correction chart.

As illustrated in FIG. 13A, in a case in which all the patches A (i.e., the patches A1-A11) do not fit in one sheet P as a correction chart, the generation unit 311 divides the patches A into a plurality of groups so that each of the plurality of groups fits in one sheet P. Specifically, the generation unit 311 divides the patches A at an edge portion of one of the patches A in the sub-scanning direction, that is, at a density boundary.

Here, the generation unit 311 preferably divides the patches A into groups so that the divided patches A fit on a minimum number of sheets P to be used. Next, the generation unit 311 generates a correction chart for each of the divided or grouped patches A. Note that, for each of the correction charts thus generated, the generation unit 311 adds the marks M1 described above. Then, the print control unit 312 causes the image forming device 12 to print the generated correction charts on the respective sheets P.

FIG. 13B illustrates an example of division of the patches A illustrated in FIG. 13A.

Specifically, FIG. 13B illustrates an example in which the patches A1 to A11 illustrated in FIG. 13A is divided into two at a density boundary between the patches A4 and A5 and a correction chart including the patches A1 to A4 and a correction chart including the patches A5 to A11 are printed on sheets P1 and P2, respectively.

Note that the derivation unit 313 performs the same processing as described above based on read data provided by the reading device 133 reading each of the sheets P1 and P2, to detect the density from the remaining area excluding the invalid areas B1 and B2 from the correction chart.

Thus, even in a case in which the length of the correction chart in the sub-scanning direction is equal to or greater than the length of the sheet P in the sub-scanning direction, the image forming apparatus 1 derives a correction parameter with a plurality of sheets P. That is, the image forming apparatus 1 forms a correction chart having a size according to the flare characteristics, without being affected by limitation in size of the sheet P.

Figure 14:
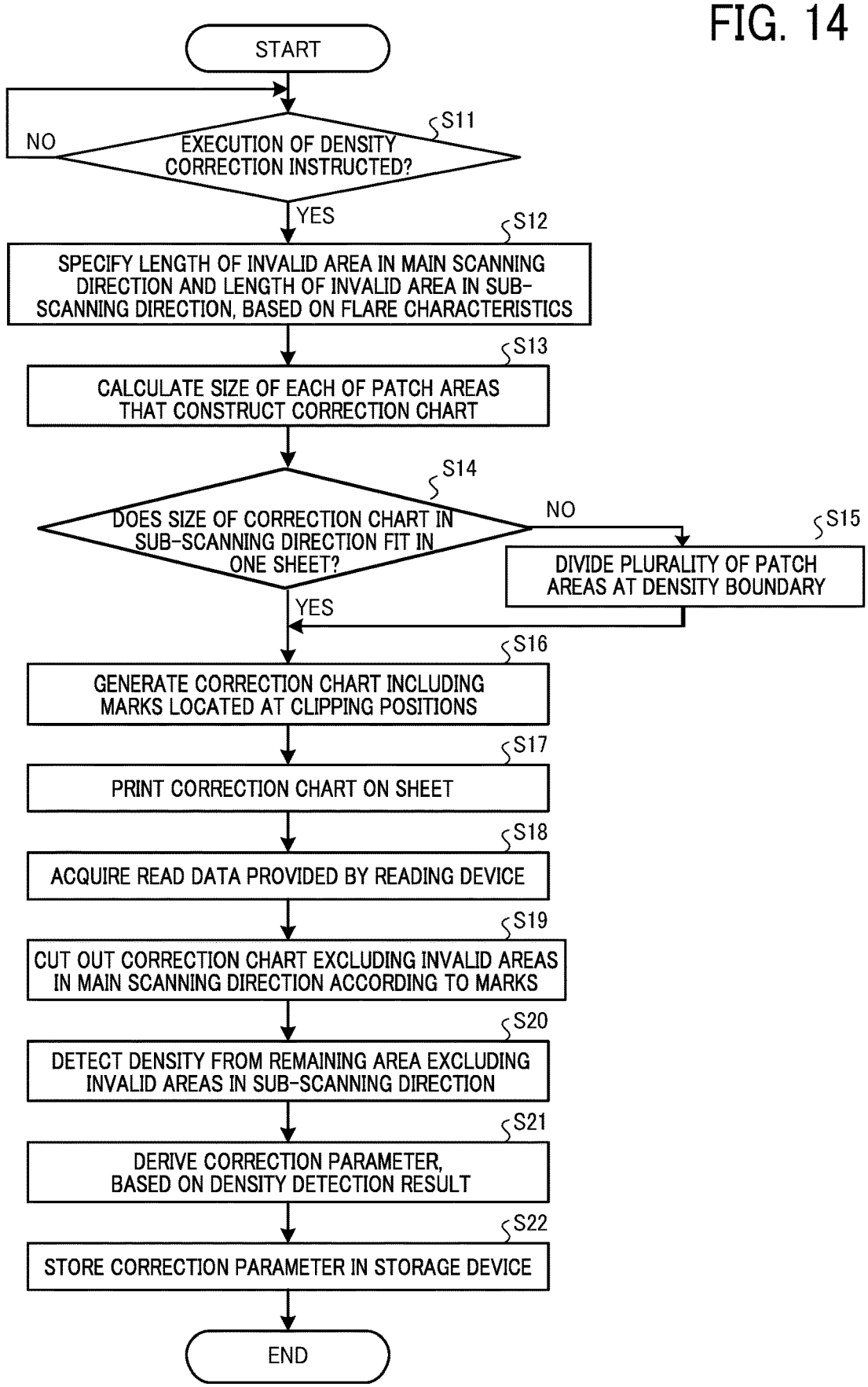
FIG. 14 is a flowchart illustrating an operation of a processing device of an image forming apparatus according to an embodiment.

Referring now to FIG. 14, a description is given of an operation of the image forming apparatus 1 (specifically, the processing device 30) related to the derivation of the correction parameter.

FIG. 14 is a flowchart illustrating an example of the operation of the image forming apparatus 1 (specifically, the processing device 30).

First, in step S11, the generation unit 311 determines whether an execution of density correction is instructed.

When the execution of density correction is not instructed (NO in step S11), the generation unit 311 waits until the execution of density correction is instructed. Here, the execution of density correction may be manually instructed through the operation device 20, or may be automatically instructed at the time of starting the image forming apparatus 1 or at given intervals.

By contrast, when the execution of density correction is instructed, in other words, in response to an instruction of the execution of density correction (YES in step S11), in step S12, the generation unit 311 specifies the length dX1 in the main scanning direction and the length dY1 in the sub-scanning direction defining the invalid areas B1 and B2, respectively, based on the flare characteristics of the specification information 351.

Subsequently, in step S13, the generation unit 311 calculates the size of each of the patches A that constructs a correction chart, based on the size of a sheet P to be used, the result of operation in step S12, and the ratio between the reading resolution and the reference resolution, for example.

Next, in step S14, the generation unit 311 determines whether the size of the correction chart in the sub-scanning direction (i.e., the length of the correction chart in the sub-scanning direction) calculated in step S13 fits in one sheet P.

When the generation unit 311 determines that the size of the correction chart in the sub-scanning direction fits in one sheet P (YES in step S14), in step S16, the generation unit 311 generates the correction chart including the marks M1 located at positions indicating the invalid areas B1, that is, at clipping positions of the correction chart.

On the other hand, when the generation unit 311 determines that the size of the correction chart in the sub-scanning direction does not fit in one sheet P (NO in step S14), in step S15, the generation unit 311 divides the patches A (as a plurality of patch areas) at a density boundary into a plurality of groups such that the size or length, in the sub-scanning direction, of a correction chart constructed of each group of the divided patches A falls within the size or length of the sheet P in the sub-scanning direction. Next, in step S16, the generation unit 311 generates a correction chart including the marks M1 for each group of the divided patches A.

Subsequently, in step S17, the print control unit 312 causes the image forming device 12 to print the correction chart generated in step S16 on the sheet P. As the correction chart is printed on the sheet P in step S17, the reading device 133 reads the sheet P bearing the correction chart.

In step S18, the derivation unit 313 acquires read data provided by the reading device 133.

In step S19, the derivation unit 313 cuts out the correction chart excluding the invalid areas B1 in the main scanning direction, according to the marks M1 included in the read data.

Next, in step S20, the derivation unit 313 detects the density from the remaining area (i.e., target area) excluding the invalid areas B2, for each of the patches A included in the cut correction chart.

Subsequently, in step S21, the derivation unit 313 derives a correction parameter for correcting a density unevenness, based on the detection result in step S20.

Then, in step S22, the derivation unit 313 stores the derived correction parameter as the correction parameter 353 in the storage device 35. Thus, the process ends.

As described above, the image forming apparatus 1 (specifically, the processing device 30) generates a correction chart in which opposed end portions of the plurality of patches A in the main scanning direction are located outside the two marks M1 in the main scanning direction. Then, the image forming apparatus 1 (specifically, the processing device 30) derives correction data, based on read data provided by the reading device 133 reading the correction chart formed on a sheet P. Specifically, the read data includes read data of an area of the plurality of patches A existing inside the two marks M1 in the main scanning direction. The image forming apparatus 1 (specifically, the processing device 30) derives correction data, based on the read data of the area of the plurality of patches A existing inside the two marks M1 in the main scanning direction.

That is, in the image forming apparatus 1, the processing device 30 detects the density from each of the patches A while reducing the influence of the flare that occurs when the reading device 133 reads the patches A in the main scanning direction. Accordingly, the image forming apparatus 1 (specifically, the processing device 30) enhances the detection accuracy, resulting in derivation of an accurate correction parameter.

The image forming apparatus 1 (specifically, the processing device 30) generates a correction chart including part or all of the plurality of patches A having a length in the sub-scanning direction including the range of the flare that affects reading, by the reading device 133, of the plurality of patches A in the sub-scanning direction. Then, the image forming apparatus 1 (specifically, the processing device 30) derives the correction data, based on read data provided by the reading device 133 reading the correction chart. Specifically, the read data includes read data of a remaining patches excluding the affected area in the sub-scanning direction from the correction chart. The image forming apparatus 1 (specifically, the processing device 30) derives correction data, based on the read data of the remaining patches excluding the affected area in the sub-scanning direction from the correction chart.

That is, in the image forming apparatus 1, the processing device 30 detects the density from each of the patches A while reducing the influence of the flare that occurs when the reading device 133 reads the patches A in the sub-scanning direction. Accordingly, the image forming apparatus 1 (specifically, the processing device 30) enhances the detection accuracy, resulting in derivation of an accurate correction parameter.

The embodiment described above may be modified as appropriate by changing part of the configuration or functions of the image forming apparatus 1 (or the processing device 30). A description is now given of variations of the embodiment described above as other embodiments. Hereinafter, differences from the above-described embodiment will be mainly described. A detailed description of the variations redundant with the embodiment described above is herein omitted unless otherwise required. The variations described below may be individually implemented or may be combined as appropriate and implemented.

Now, a description is given of a first variation.

In the embodiment described above, the correction chart is generated with the marks M1 located at the positions indicating the invalid areas B1. However, the correction chart may be generated without the marks M1, as in the case of the invalid areas B2. In such a case, similarly to the process of excluding the invalid area B2, the derivation unit 313 excludes the invalid area B1 from each edge portion of the patches A in the main scanning direction, based on the value of the length dX1 defining the invalid area B1 specified by the generation unit 311.

Accordingly, the image forming apparatus 1 (specifically, the processing device 30) of the present variation attains substantially the same advantages attained in the embodiment described above, thus enhancing the detection accuracy, resulting in derivation of an accurate correction parameter.

According to the embodiments of the present disclosure, correction is performed with a correction chart while the influence of a flare is reduced.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

What is claimed is:

1. An image forming apparatus comprising:
an image forming device including a head, the head including a plurality of nozzles and being configured to discharge ink droplets through the plurality of nozzles to form an image on a recording medium conveyed in a first direction;
a reading device configured to read the image formed on the recording medium; and
circuitry configured to generate a correction chart, the correction chart including:
a plurality of patches located in the first direction and representing different densities from each other; and
two marks located at different positions from each other in a second direction perpendicular to the first direction, wherein the two marks are located at positions determined by the circuitry based on a range of flare that affects reading, by the reading device, of the plurality of patches on the recording medium,
the circuitry being configured to locate opposed end portions of the plurality of patches in the second direction outside the two marks in the second direction,
the circuitry being configured to derive correction data, based on read data provided by the reading device reading the correction chart formed on the recording medium, the read data including read data of an area of the plurality of patches existing inside the two marks in the second direction,
the circuitry being configured to derive the correction data, based on the read data of the area of the plurality of patches existing inside the two marks in the second direction.

2. The image forming apparatus according to claim 1, wherein the circuitry is configured to set a length of part or all of the plurality of patches in the first direction to a length including a range of a flare that affects reading, by the reading device, of the plurality of patches in the first direction,
wherein the read data provided by the reading device further includes read data of a rest of the plurality of patches excluding the range in the first direction, and
wherein the circuitry is configured to derive the correction data, based on the read data of the rest of the plurality of patches excluding the range in the first direction.

3. The image forming apparatus according to claim 2, wherein the circuitry is configured to set a length, in the first direction, of one of the plurality of patches representing a highest density to a length including the range.

4. The image forming apparatus according to claim 1, wherein the circuitry is configured, in a case in which the correction chart does not fit in the recording medium, to divide the plurality of patches at a boundary in the first direction into a size according to the recording medium to generate a plurality of correction charts, and
wherein the circuitry is configured to derive the correction data, based on read data provided by the reading device reading the plurality of correction charts.

5. A method for deriving correction data, the method comprising:
generating a correction chart, the correction chart including:
a plurality of patches located in a first direction in which a recording medium is conveyed,
the plurality of patches representing different densities from each other; and
two marks located at different positions from each other in a second direction perpendicular to the first direction, wherein the two marks are located at positions determined based on a range of flare that affects reading of the plurality of patches on the recording medium,
the generating including locating opposed end portions of the plurality of patches in the second direction outside the two marks in the second direction; and
deriving correction data, based on read data provided by a reading device reading the correction chart formed on the recording medium, the read data including read data of an area of the plurality of patches existing inside the two marks in the second direction,
the deriving including deriving the correction data, based on the read data of the area of the plurality of patches existing inside the two marks in the second direction.

6. A non-transitory, computer-readable storage medium storing computer-readable program code that causes a computer to perform a method for deriving correction data, the method comprising:
generating a correction chart, the correction chart including:
a plurality of patches located in a first direction in which a recording medium is conveyed,
the plurality of patches representing different densities from each other; and
two marks located at different positions from each other in a second direction perpendicular to the first direction, wherein the two marks are located at positions determined based on a range of flare that affects reading of the plurality of patches on the recording medium,
the generating including locating opposed end portions of the plurality of patches in the second direction outside the two marks in the second direction; and deriving correction data, based on read data provided by a reading device reading the correction chart formed on the recording medium, the read data including read data of an area of the plurality of patches existing inside the two marks in the second direction, the deriving including deriving the correction data, based on the read data of the area of the plurality of patches existing inside the two marks in the second direction.

\* \* \* \* \*